US012692897B2

(12) United States Patent
Ivarsson et al.

(10) Patent No.: US 12,692,897 B2
(45) Date of Patent: * Jul. 28, 2026

(54) ANTI-THEFT LOCKING BOLT ASSEMBLY

(71) Applicant: RIMGARD SWEDEN AB, Solna (SE)

(72) Inventors: Lars Ivarsson, Stockholm (SE);
Marcus Ekström, Hägersten (SE)

(73) Assignee: Rimgard Sweden AB, Täby (SE)

( * ) Notice: Subject to any disclaimer, the term of this patent is extended or adjusted under 35 U.S.C. 154(b) by 381 days.

This patent is subject to a terminal disclaimer.

(21) Appl. No.: 18/683,291

(22) PCT Filed: Aug. 2, 2022

(86) PCT No.: PCT/US2022/039170
§ 371 (c)(1),
(2) Date: Feb. 13, 2024

(87) PCT Pub. No.: WO2023/018580
PCT Pub. Date: Feb. 16, 2023

(65) Prior Publication Data
US 2024/0369095 A1 Nov. 7, 2024

Related U.S. Application Data

(63) Continuation-in-part of application No. 17/401,572, filed on Aug. 13, 2021, now Pat. No. 11,788,574.

(30) Foreign Application Priority Data

Aug. 13, 2021 (SE) .................................... 2150999-7

(51) Int. Cl.
*F16B 41/00* (2006.01)
*B60B 3/16* (2006.01)
*F16B 37/14* (2006.01)

(52) U.S. Cl.
CPC ............ *F16B 41/005* (2013.01); *B60B 3/165* (2013.01); *F16B 37/14* (2013.01)

(58) Field of Classification Search
CPC F16B 41/005; B60B 3/165; B60B 2900/3318
See application file for complete search history.

(56) References Cited

U.S. PATENT DOCUMENTS 3,978,699 A 9/1976 Triniak
4,703,636 A 11/1987 Minami
4,824,305 A 4/1989 McCauley
(Continued)

OTHER PUBLICATIONS

PCT/US2022/039170, International Search Report and Written Opinion of International Searching Authority, Oct. 26, 222.

*Primary Examiner* — Mark A Williams
(74) *Attorney, Agent, or Firm* — Koivula & Somersalo LLC

(57) ABSTRACT

An anti-theft locking bolt assembly is disclosed. The assembly comprises an anti-theft bolt threadedly attachable to an article to be protected, a bolt cap snugly fitting into a bore on the head of the anti-theft bolt, a lock cylinder housing at least partially rotatably connected to the head of the anti-theft bolt, the lock cylinder housing configured to cover the bolt cap and a locking cylinder and to provide means to prevent removal of the bolt cap. The anti-theft locking bolt assembly is suitable to lock a vehicle wheel and also to replace a spark plug of an combust engine to prevent unauthorized use of the vehicle.

14 Claims, 8 Drawing Sheets

(56) References Cited

U.S. PATENT DOCUMENTS

| | | |
|---|---|---|
| 6,609,401 B1 | 8/2003 | Iskhakbayev |
| 6,726,515 B1 | 4/2004 | Demange |
| 8,444,167 B1 | 5/2013 | Derdari |
| 9,200,666 B1 | 12/2015 | Cadena |
| 9,689,180 B2 | 6/2017 | Ivarsson |
| 10,486,461 B1 | 11/2019 | Ivarsson et al. |
| 10,612,581 B2 | 4/2020 | Rajewski et al. |
| 2011/0044784 A1 | 2/2011 | Da Fonseca et al. |
| 2012/0000259 A1 | 1/2012 | Gilbert |
| 2014/0077582 A1 | 3/2014 | Sims |
| 2014/0178147 A1 | 6/2014 | Lin |
| 2016/0032959 A1 | 2/2016 | Cadena |
| 2017/0067499 A1 | 3/2017 | Thomas |
| 2017/0343034 A1 | 11/2017 | Zollmann |
| 2019/0023449 A1 | 1/2019 | Barton et al. |
| 2021/0229489 A1 | 7/2021 | Ivarsson et al. |

ANTI-THEFT LOCKING BOLT ASSEMBLY

CROSS REFERENCE TO RELATED APPLICATIONS

This application is a U.S. National Stage application filed under 35 U.S.C. 371 of PCT/US2022/039170, filed on Aug. 13, 2022, which claims priority to Sweden Patent Application No. 2150999-7, filed on Aug. 13, 2021 and is a continuation in part of U.S. patent application Ser. No. 17/401,572 filed on Aug. 13, 2021.

FIELD OF INVENTION

This invention relates to a locking bolt assembly capable of being locked in place to prevent unauthorized removal or use of an article locked with the assembly.

BACKGROUND OF THE INVENTION

There are various anti-theft solutions available for example to prevent unauthorized removal of car wheels. Some devices specifically meant for car wheels are disclosed for example in the applicant's previous patents U.S. Pat. Nos. 9,689,180 and 10,486,461.

Anti-theft solutions to prevent access to a head of a locking bolt are disclosed in patent application publication GB2073298. This publication discloses a three-part locking bolt assembly, comprising a nut, a shroud and a key-operated lock. In this device a nose of the lock engages with the nut via a spring ring, and the lock has key-actuated detents engaging with the shroud. In DE3017879 a system is disclosed where a locking bolt is provided with a cylindrical longitudinal bore having a radially extending groove into which a corresponding outer contour of a key-operated lock attaches. Thus, in both of these approaches the lock is directly attached to the locking bolt. The problem with this kind of solution is that because they require the lock being directly attached to the locking bolt, the structures engaging the lock to the locking bolt may deteriorate upon long use and the lock no more is secure.

There are additionally various publications that disclose anti-theft or security-systems where the operation is based on a nut having a specific geometric design matching to the bolt, and a socket key having a design matching to the nut design. Examples of such publications are U.S. Pat. No. 10,612,581 and international application WO0109527. With these type of solutions, the problem is a limited number of alternative designs. Maximally such systems can provide hundreds of individual designs and therefore there is an existing thread that two locks have same keys. Moreover, these locks are inherently not very secure in a sense that they can be pulled out by hammering a non-matching socket key on the nut.

Accordingly, there is a need for additional devices and method with practically unlimited number of alternative locking codes or keys to provide security.

SUMMARY OF THE INVENTION

In view of the above, an object of this invention is to provide a technology that addresses at least some of the above concerns. This and other objects, which will become apparent in the following, are accomplished by an assembly and a method defined in the claims.

Thus, according to a first aspect of this invention an anti-theft bolt lock assembly is provided for a locking system to prevent unauthorized removal or use of articles where the locking system is attached.

According to an aspect of this invention an anti-theft locking bolt assembly is provided, the assembly comprising: an anti-theft bolt, a bolt cap, a lock cylinder housing and a lock cylinder; the anti-theft bolt comprising a shaft and a head, the shaft having an external threading configured to match a threating of an article to be protected, and an inner channel, the head having a generally flat upper surface comprising a center bore having a noncircular perimeter; the bolt cap having a top part, a bottom part, and a central hole extending through the top and bottom parts, the top part having a perimeter larger than a perimeter of the bottom part thus forming a lip, the top part having at least one straight part on its perimeter, and the bottom part having a non-circular perimeter matching with the non-circular perimeter of the center bore, and the bolt cap being configured to be attached with attaching means onto the anti-theft bolt through the central hole when the bottom part of the bolt cap is inserted into the central bore; the cylindrical lock housing configured to cover the lock cylinder and the bolt cap and having at least one inner slot for adapting a lock stud and the lip of the bolt cap to provide a locking medium for the lock cylinder and the bolt cap, and the lock cylinder housing configured to rest on top of the anti-theft bolt head, wherein the assembly comprises means to allow at least partially free rotation of the lock cylinder housing on top of the anti-theft bolt head thus preventing transfer of torque to the anti-theft bolt; and wherein the anti-theft bolt lock assembly is in locked position when the lock cylinder housing is resting on the anti-theft bolt, the bolt cap is inserted through the upper opening of the housing such that the bottom part of the bolt cap snugly fits into the central bore, the lip of the top part rests on an lower inner edge of the at least one slot of the lock cylinder housing, and the lock cylinder is inserted through the upper opening into the lock cylinder housing and turned such that the stud extends into the slot and is blocked by an upper inner edge of the slot.

The non-circular perimeter of the bottom part and of the center bore may be a polygonal pattern, such as pentagon, hexagon, heptagon, octagon.

The inner channel of the shaft may open into the bottom of the center bore. The inner channel may be threaded and the means for attaching the bolt cap to the anti-theft bolt may be a screw. According to another embodiment the inner channel is not threaded and the means for attaching the bolt cap to the anti-theft bolt may be at least one pin.

The bolt cap may have a middle part in between the bottom and top parts. The middle part may be circular.

According to certain aspects of the invention the means to allow at least partially free rotation of the lock cylinder housing on top of the anti-theft bolt head to prevent transfer of torque to the bolt may be at least one ball bearing or at least one control washer between the lock cylinder housing and the bolt head.

The lower end of the lock cylinder housing may be flat, or it may have a circular groove to adapt the at least one bearings. According to certain aspects of the invention the lower end of the lock cylinder housing may have dents matching with flaps on the control washer.

The flat surface of the anti-theft bolt head may be smooth, or it may be patterned. The flat surface may include one or more half round indentations or the at least one indentation may be a circular groove to adapt one or more ball bearings. The flat surface may have a pattern corresponding to a pattern of a surface of the control washer.

The assembly disclosed here has multitude of locking combinations depending on length of the lock cylinder, as longer cylinder allows larger number of lock pins inside the cylinder. The assembly has at least 60 000 different combinations. The assembly may have at least 200 000 different combination, the assembly may have over 8 million combinations.

The outer threading of the anti-theft bolt may mate with threads on a vehicle wheel hub and the assembly is configured to prevent unauthorized removal of a vehicle wheel. The outer threading of the anti-theft bolt may mate with a threading of combustion engine spark plug slot and the assembly is configured to prevent unauthorized starting of the engine by replacing a spark plug with the assembly.

According to certain aspects of the invention a method is provided to prevent unauthorized removal of an article, the method comprising attaching the anti-theft lock assembly onto the article. The article may be a vehicle wheel. The article may be a vehicle having a combustion engine and the anti-theft lock assembly is used to replace a spark plug.

The at least one indentation may equally well be a circular groove adapted for one or more ball bearings.

Figure 4:
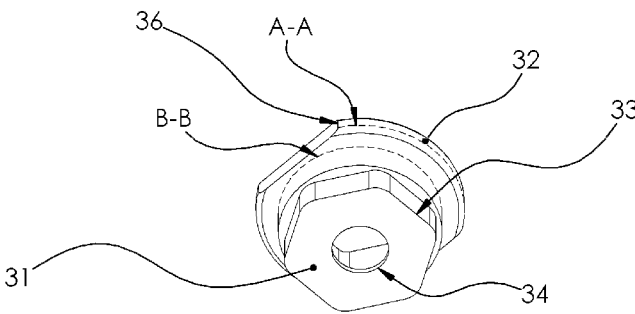
Figure 4:
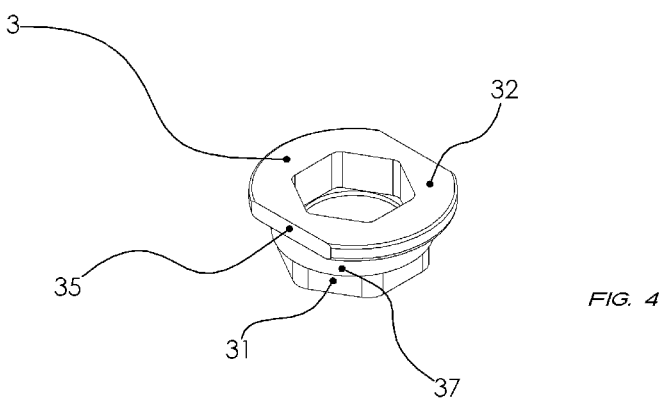
Figure 8:
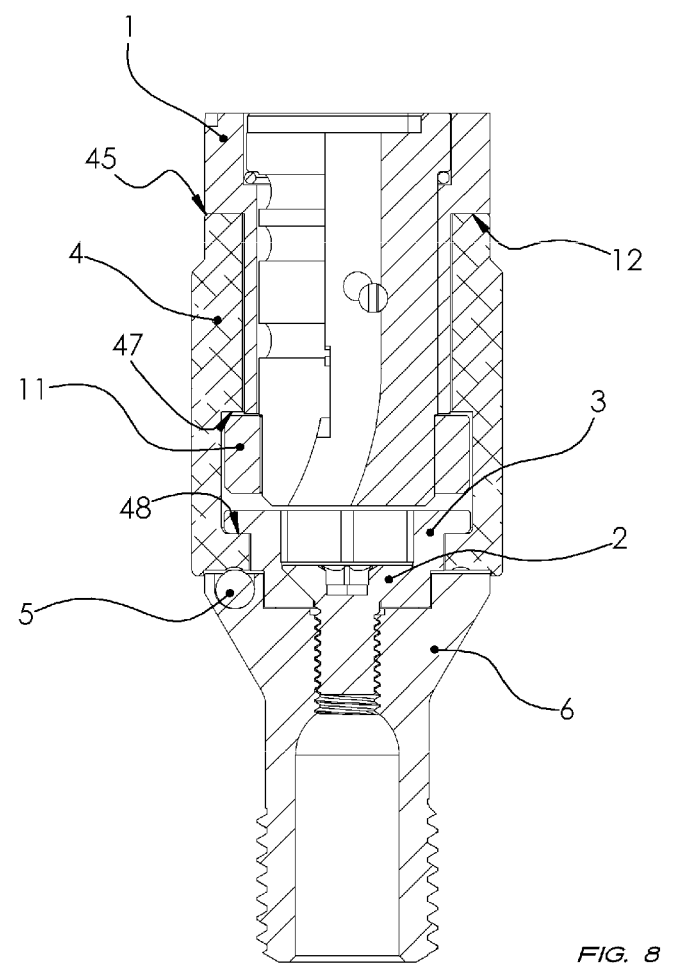

FIG. 4 shows the bolt cap 3 in two perspectives. The upper view is a bottom view of the of the bolt cap and the lower view is a top view of the bolt cap. In each figure the bottom part 31 and the top part of the cap 32 is visible. Both of the figures also show the non-circular perimeter 33 of the bottom part 31. The central hole 34 is shown in the bottom view. The top part 32 has a perimeter A-A larger than a perimeter B-B of the bottom part 31 and thus the top part forms a lip 36. The lip 36 of the top part 32 has at least one straight part 35 on its perimeter to allow the bolt cap 3 to be entered through the upper opening 44 of the housing (shown in FIG. 6) in only one way. The lip 36 also has a purpose to lock the bolt cap behind a lower inner edge 48 of the housing as shown in FIG. 8. There may be a middle part 37 between the top part 32 and the bottom part 31 as is shown in FIG. 4. The middle part forms an edge that rests against the flat surface of the anti-theft lock bolt as is visible in FIG. 8.

Figure 5:
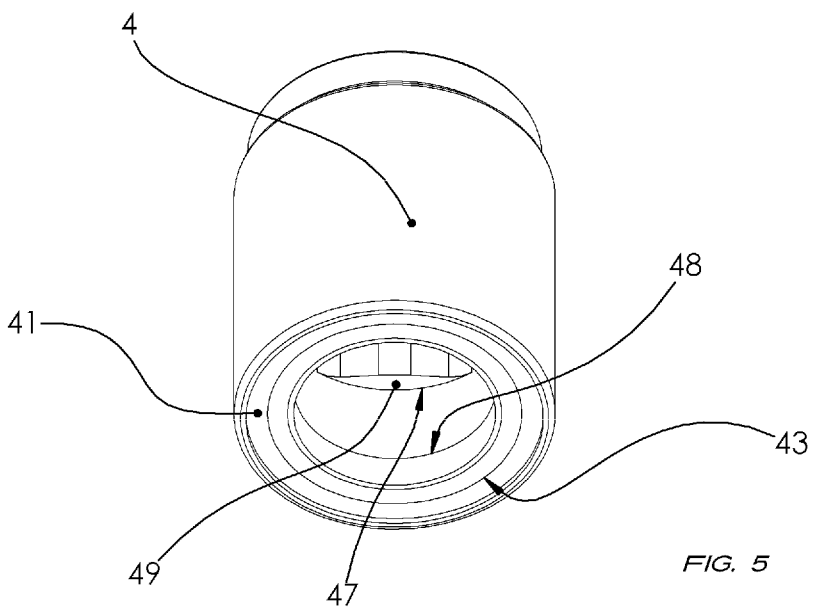

FIG. 5 shows a bottom view of the lock cylinder housing 4. In this embodiment, the lower end 41 of the housing has a circular groove 43 configured to adapt the ball bearings 5 (shown in FIG. 2). In another embodiment the lower end of the housing 41 is flat. Visible inside the lock cylinder housing is the slot 49 forming a lower inner edge 48 and upper inner edge 47.

Figure 6:
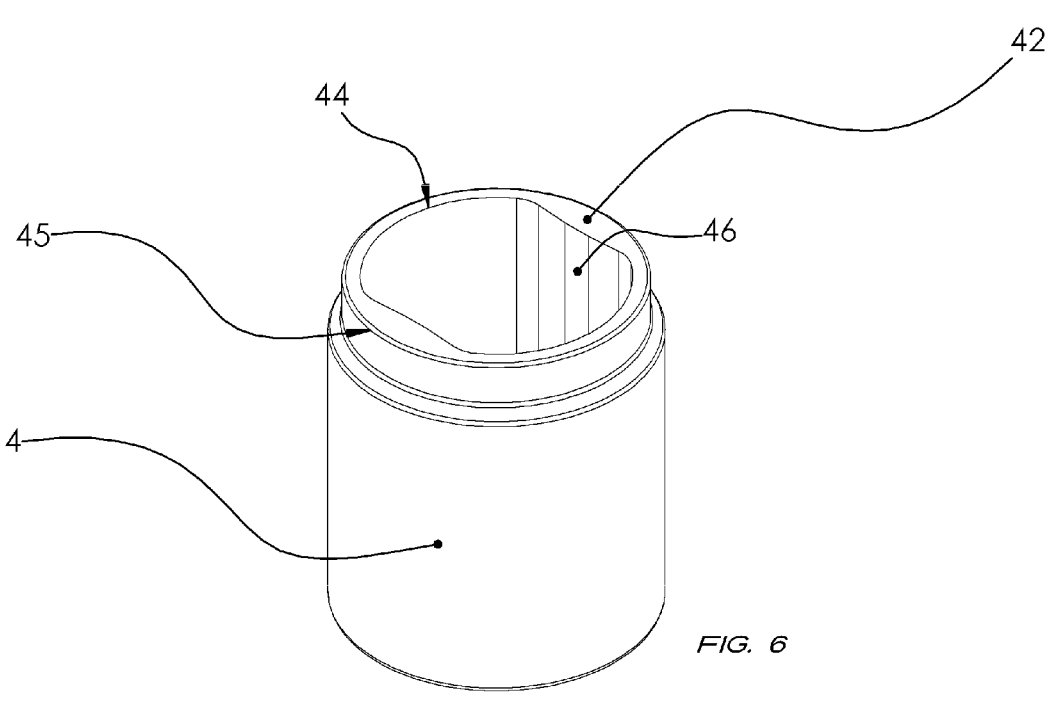

FIG. 6 shows the lock cylinder housing 4 with a view to the upper end 42 of the housing. The upper opening 44 has a shape such that the lock cylinder 1 and the bolt cap 3 fit through the hole only in one way, i.e. the opening has at least one flat surface 46 making the opening to have a shape matching with the shape of the lock cylinder and the bolt cap. The lock cylinder housing 4 has an outer edge 45 on which a head 12 of the lock cylinder 1 is resting as can be seen in from FIG. 8.

Figure 7:
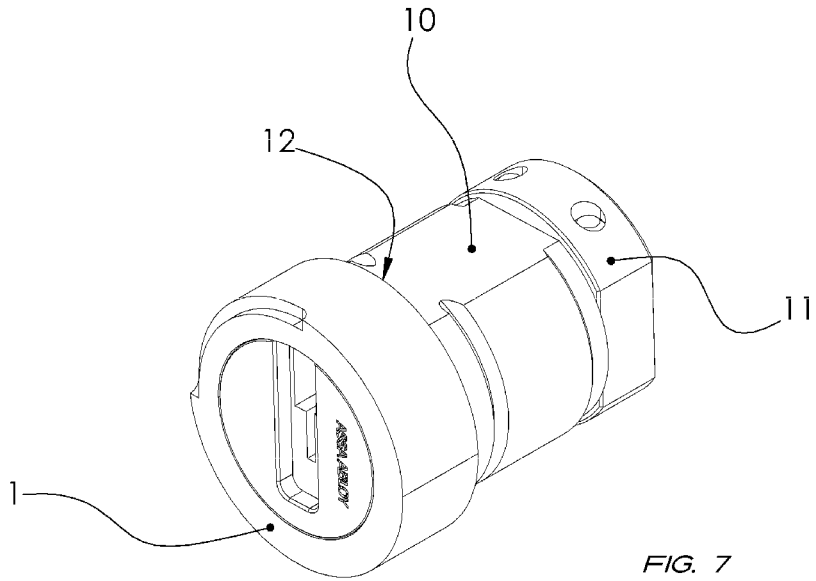

FIG. 7 shows the lock cylinder 1 in locking position. The figure shows the flat surface of the lock 10 to allow the lock to be inserted into the lock cylinder housing 4 only one way when the lock cylinder is in unlocked position such that the flat surface of the lock 10 and the flat surface 46 of the upper opening of the housing match. The figure shows the stud 11 of the lock which can be turned by a key of the lock. The lock cylinder 1 is locked into the lock cylinder housing 4 by operation of the key such that the stud 11 becomes blocked behind an upper inner edge 47 (visible in FIG. 8) of the lock cylinder housing. The locking bolt of this invention can be made with practically endless number of variations depending on the length of the lock cylinder housing. The locking mechanism of a lock cylinder is generally based on a correct key aligning pins and allowing movement of the key plug. Due to the combinatorics the pin within the lock cylinder can be arranged in x number of ways depending on the number of the pins. Increasing the length of the cylinder allows adding more pins and the combinations will increase exponentially. In an exemplary embodiment using six pins about 66 000 combinations can be achieve. The number of combinations can be increased to over 8 million by increasing the length of the lock cylinder but still having a lock cylinder that is practicable for use.

FIG. 8 shows a cross sectional view of the locking bolt assembly. The figure shows lock cylinder 1, the lock cylinder housing 4, the bolt cap 3, the anti-theft bolt 6 with the threaded outer surface. The figure shows a ball bearing 5 connecting the lock cylinder housing 4 onto the anti-theft bolt 6. The lock cylinder has a lock head 12 resting on the outer edge 45 of the lock cylinder housing. The lock stud 11 is blocked behind the upper inner edge 47 of the lock cylinder housing 4, and the lip 36 of the bolt cap is blocked behind the lower inner edge 48 of the lock cylinder housing 4.

Figure 9:
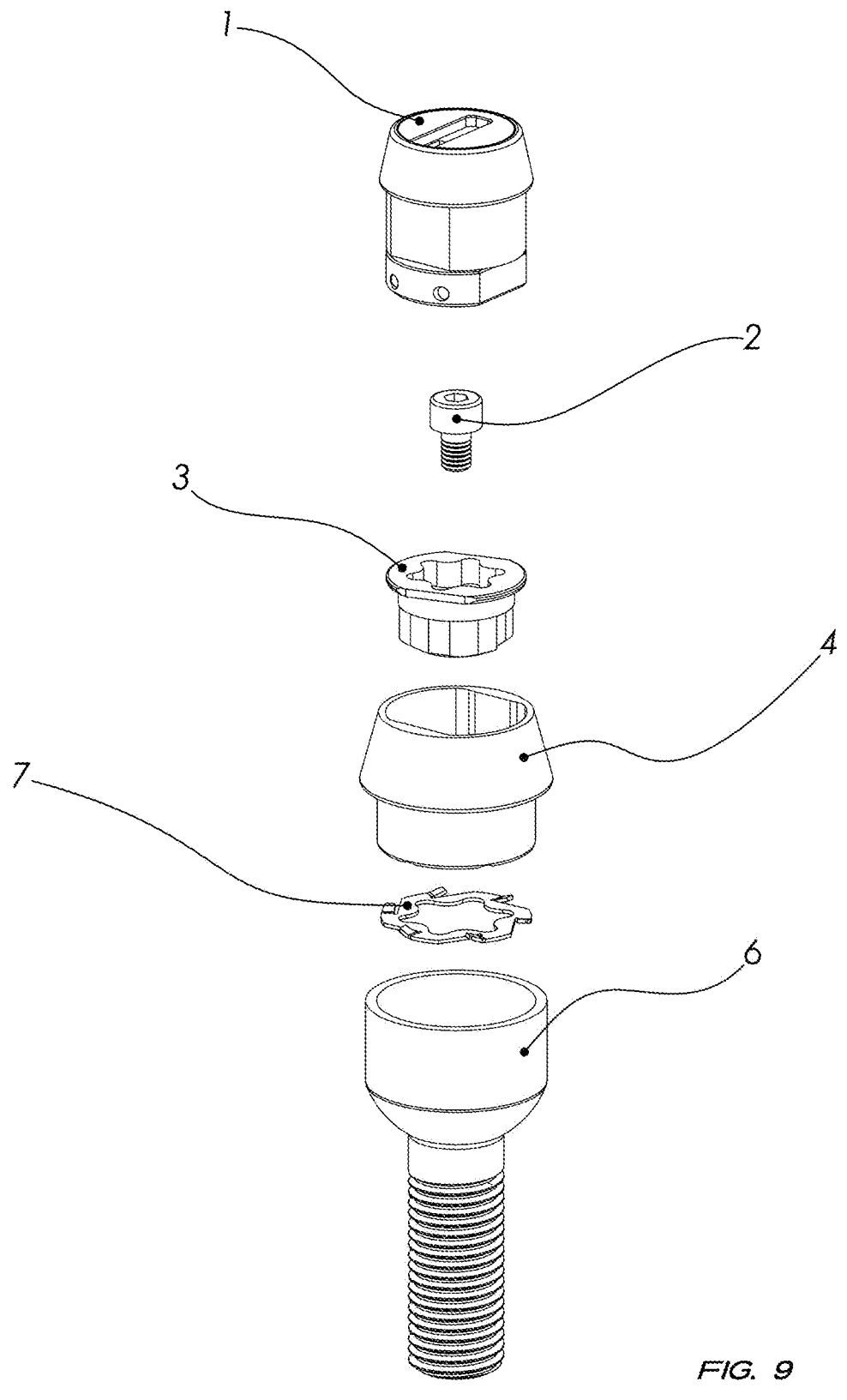

FIG. 9 shows an alternative embodiment where a control washer 7 is placed between the lock cylinder housing 4 and the antitheft bolt 6.

Figure 10:
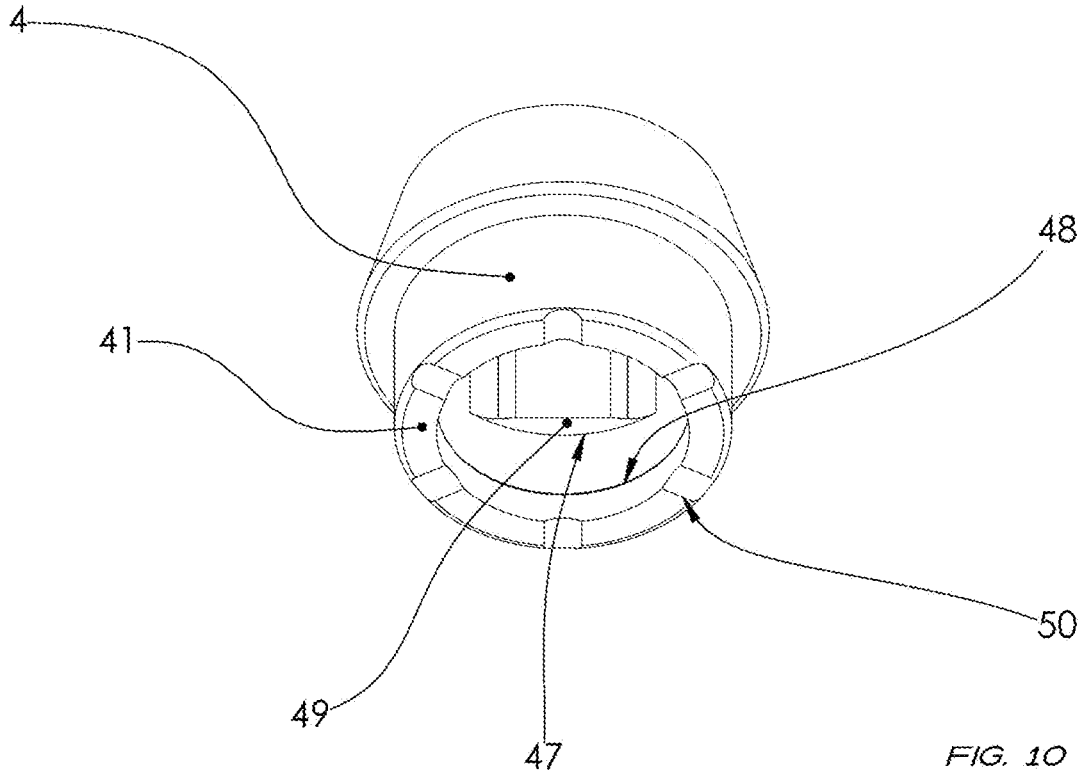

FIG. 10 shows a bottom view of the lock cylinder housing 4 having dents 50 configured to interact with the flaps 8a on the outer perimeter of the control washer.

Figure 11:
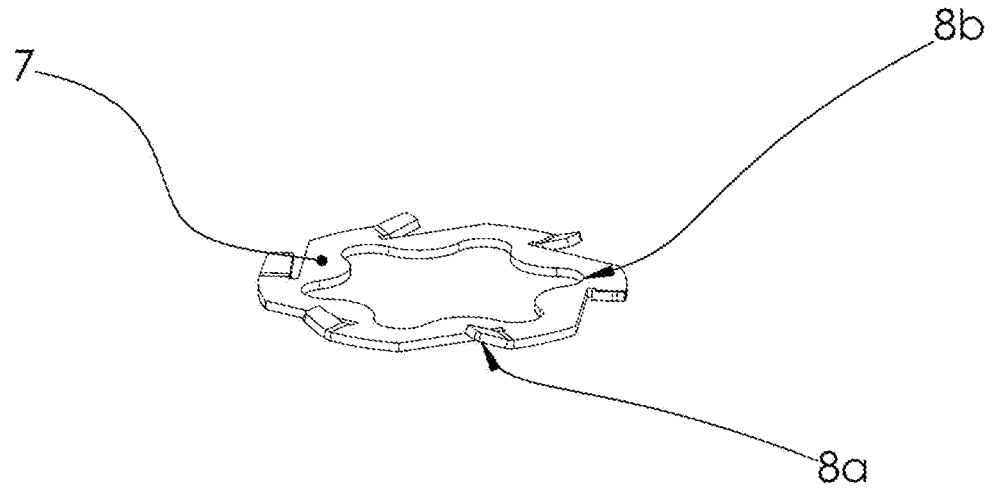

FIG. 11 shows the control washer 7 where the outer perimeter of the washer has multitude of flaps 8a for interaction with corresponding number of dents 50 of the lock cylinder housing. The washer has hexlobular shape 8b on its inner perimeter.

DETAILED DESCRIPTION OF THE INVENTION

Figure 1A:
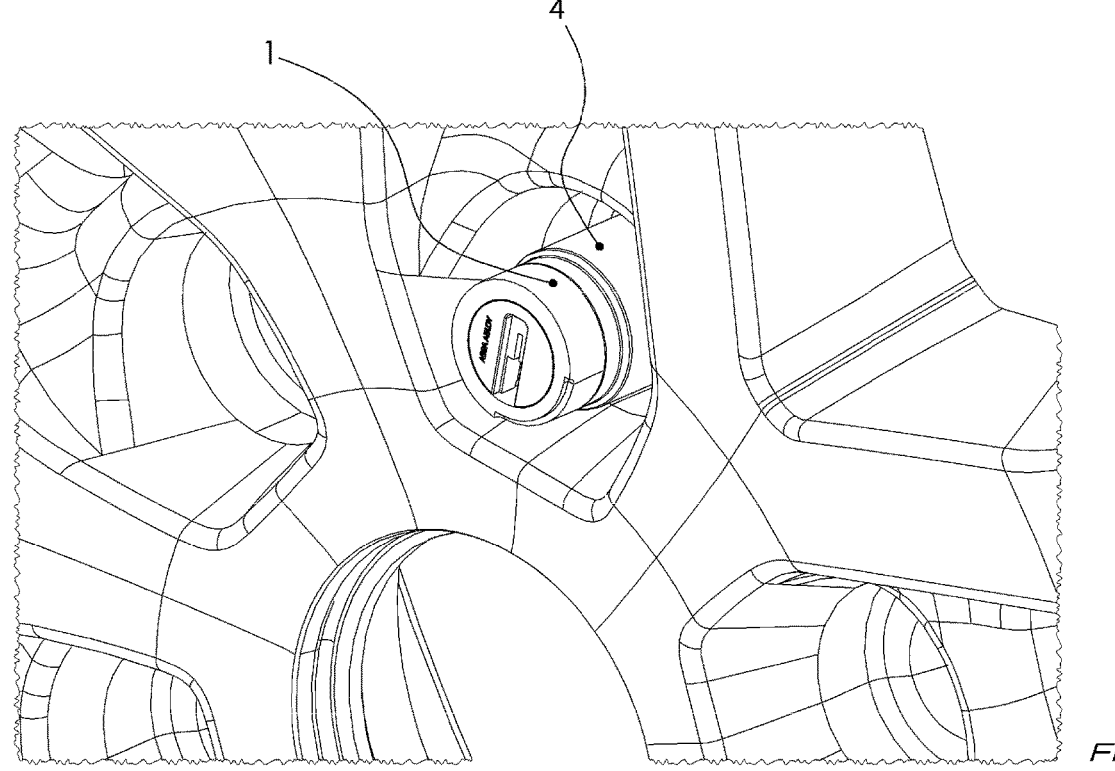
FIG. 1a illustrates the anti-theft locking bolt assembly installed to secure a car wheel in place. A lock cylinder 1 of the locking bolt assembly as well as the lock cylinder housing 4 are visible in the figure. The locking bolt assembly is installed through the rim to the hub of the car wheel thus preventing removal of the wheel without removing the locking bolt assembly first.
Figure 1B:
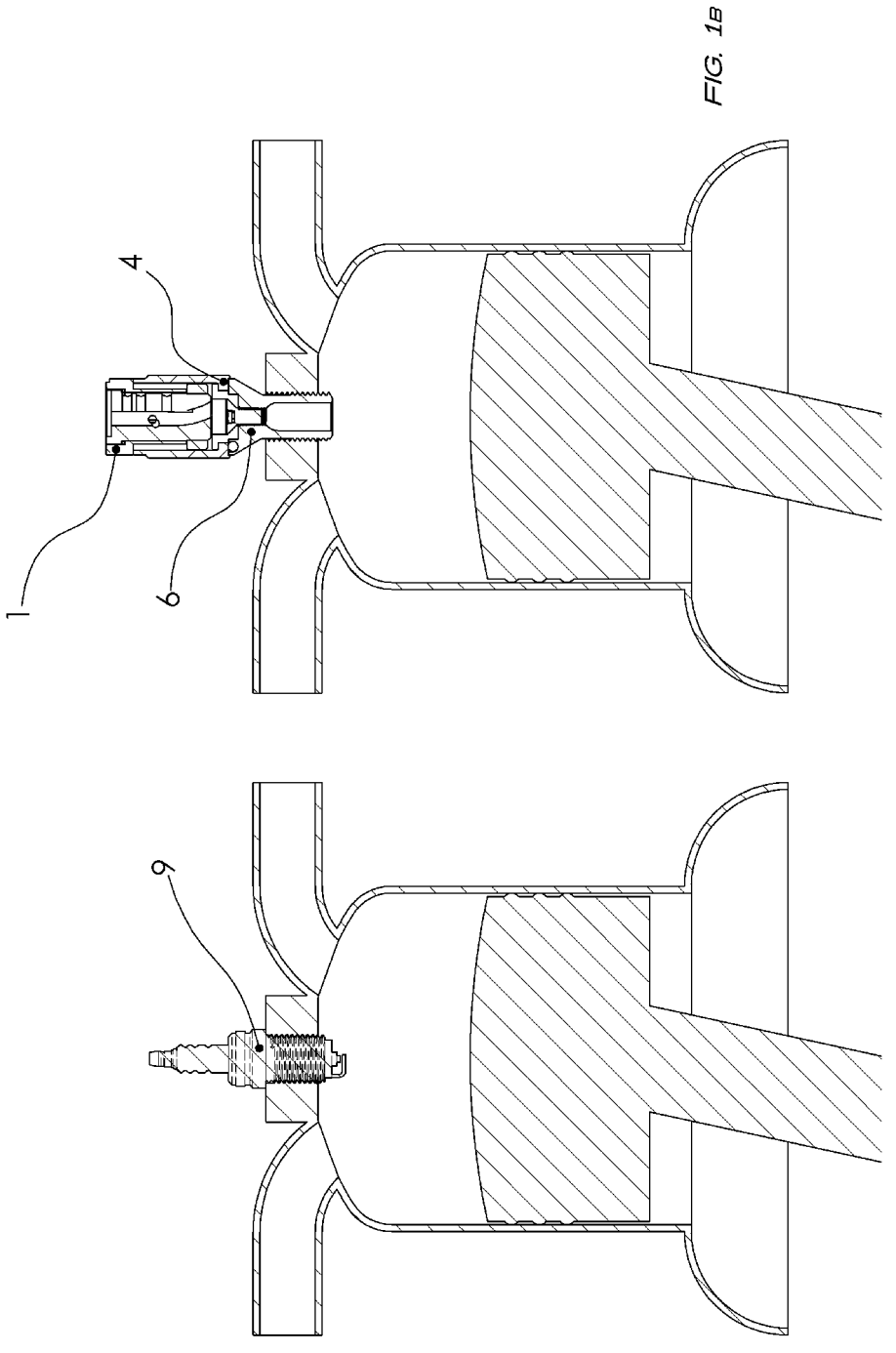
FIG. 1b illustrates an alternative use of the locking bolt assembly. Here, on the left side is illustrated a spark plug 9 attached onto a combustion engine. On the right-hand side, the spark plug has been replaced by the locking bolt assembly of the present disclosure. In the figure the anti-theft bolt 6, the lock cylinder 1, and the lock cylinder housing 4 are visible. The engine cannot be started without the spark plug and a new spark plug cannot be inserted before removing the locking bolt assembly.

An anti-theft locking bolt assembly is described here to prevent unauthorized removal or use of articles onto which the assembly is attached. The locking bolt assembly can be used for preventing unauthorized removal of car wheels (FIG. 1a), but the locking bolt assembly is as well suitable for example in protection of a vehicle engine from being started when a spark plug is replaced by the locking bolt assembly (FIG. 1b). This can be used as an anti-theft device in preventing unauthorized use for example of boats.

The invention is now described in more details in reference to the embodiments shown in the drawings.

Figure 2:
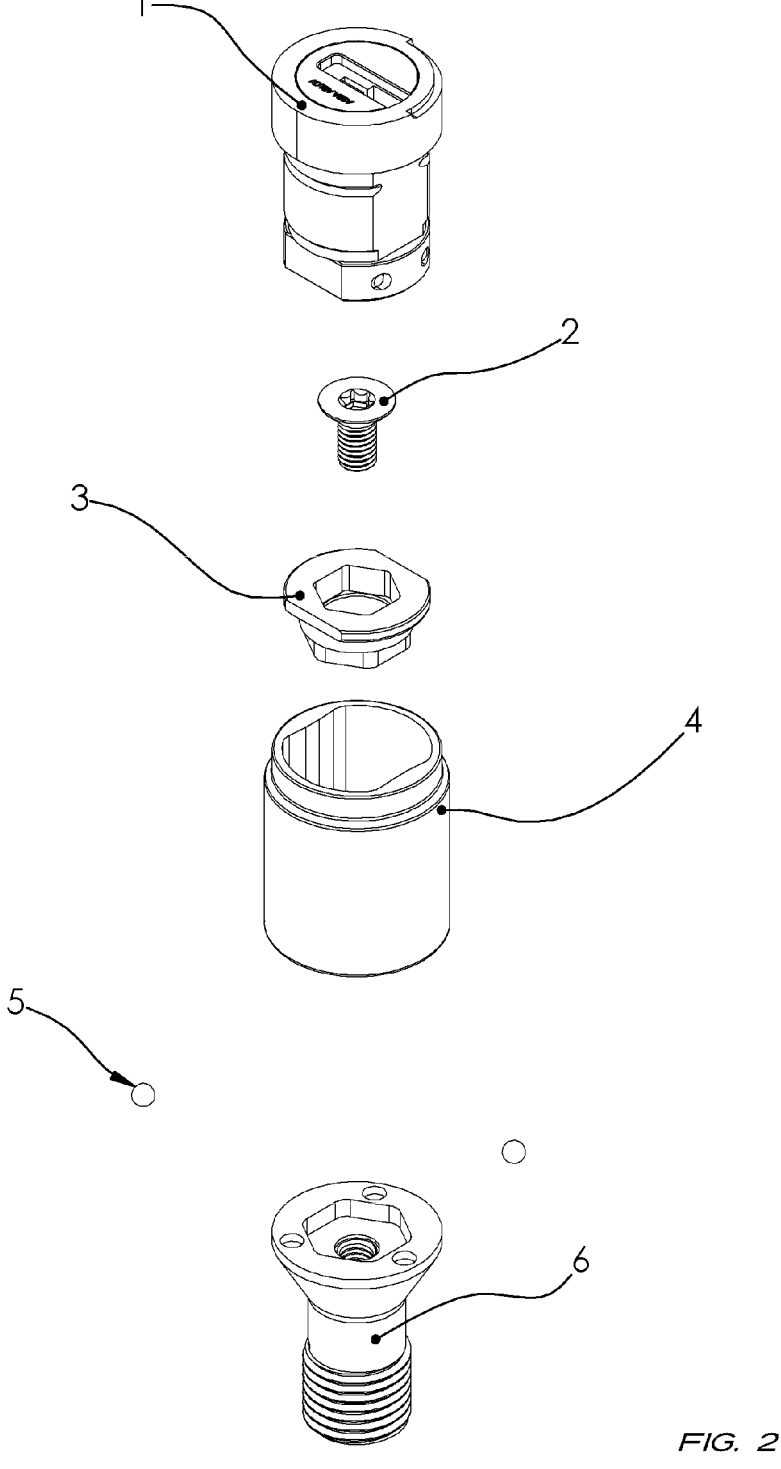
FIG. 2 illustrates an exploded view of the locking bolt assembly of this disclosure. The figure shows the lock cylinder 1, an attachment means 2 which in this embodiment is a counter sunk screw, the wheel bolt cap 3, the lock cylinder housing 4, the ball bearing 5, and the anti-theft bolt 6.

As is illustrated in FIG. 2, the locking bolt assembly according to this disclosure comprises an anti-theft bolt 6, a cylindrical lock housing 4, a bolt cap 3 and a lock cylinder 1. The assembly comprises means to allow at least partially free rotation of the lock cylinder housing 4 on top of the anti-theft bolt 6 to prevent transfer of torque to the bolt. The means as shown in FIG. 2 are the ball bearings 5. The means may as well be a control washer 7 as shown in FIG. 9. As illustrated in FIG. 4, the bolt cap has a bottom part 31 and a top part 32 and the bottom part has a noncircular perimeter 33. A central through hole 34 goes through the bottom and the top parts of the bolt cap. The top part 32 has a perimeter (A-A) larger than a perimeter (B-B) of the bottom part 31 thus forming a lip 36. The lip 36 of top part 32 has at least one straight part 35 on its perimeter to allow the bolt cap 3 to be entered through the upper opening 44 of the lock cylinder housing in only one way. The upper opening of the lock cylinder housing is shown in FIG. 6. The lip 36 also has a purpose to block the bolt cap behind a lower inner edge 48 of the housing as shown in FIGS. 8 and 10.

Figure 3:
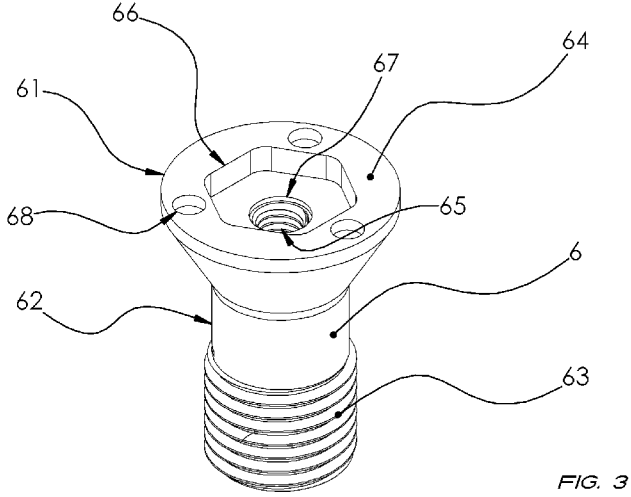
FIG. 3 is a detailed drawing of the anti-theft bolt 6. The bolt has a substantially flat head portion 61 and an externally threaded shaft 62. The flat head portion 61 comprises a center bore 66 having a non-circular perimeter 65. In this figure an embodiment is shown where a threaded inner channel 67 extends into to the shaft 62 and opens in the center of the bore 66. According to other embodiments the inner channel may not be threated. The substantially flat head portion 61 has at least one indentation 68 on its surface to adapt ball bearings. The indentations shown in this embodiment are half sphere indentations each adapted for one ball bearing.

FIG. 3 shows the anti-theft bolt 6 in more details. The anti-theft bolt has an external threading 63 on its shaft 62 and the threading is configured to mate with a threading in the article to which the bolt is to be attached, e.g., threading of a wheel hub, or threading in a spark plug lot in an engine. The head 61 of the anti-theft bolt has a generally flat upper surface 64 (in this context generally flat means that the head surface is not generally concave or convex). In the center of the flat surface there is a center bore 66 that has a non-circular perimeter 65. The non-circular pattern of the perimeter of the bore matches the non-circular pattern of the bolt cap perimeter 33 (shown in FIG. 4) such that the bottom part 31 of the bolt cap snugly fits into the bore 66 of the bolt head. Fitting snugly, means here that the perimeter of the bottom part of the bolt cap is in contact with the perimeter of the bore substantially from their full lengths, thus substantially preventing horizontal movement of the bottom part within the bore.

As shown in FIG. 3, in one embodiment the generally flat surface of the bolt head has at least one indentation 68 around the center bore 66. According to one embodiment, such as shown in FIG. 3, there are several half sphere indentations, and each is adapted for one ball bearing. The number of indentations may vary. According to some embodiments the at least one indentation is a circular groove adapted for one or more ball bearings. According to some embodiments the generally flat surface of the bolt head has a pattern that corresponds with a pattern of a surface of the control washer 7 (shown in FIG. 11).

The bolt cap 3 is attached onto the anti-theft bolt with attaching means. Preferably the attaching means is a screw 2 that is attached threadedly into the threaded inner channel 67 of the shaft 62 of the anti-theft bolt. The inner channel preferably opens into bottom of the center bore 66. In another embodiment the attaching means is at least one pin that is configured to attach inside the channel of the shaft. When the attaching means is a pin, the inner channel 67 does not need to be threaded. The channel does not need to open to the center of the bore. FIG. 3 shows an embodiment where the inner channel 67 inside the shaft 62 is threaded and the means to attach the bolt cap to the bolt is via a screw 2 (shown in FIG. 2) that has threading matching the inner threading of the inner channel 67.

FIGS. 5 and 6 illustrate the structure of the lock cylinder housing 4 that is configured to cover the anti-theft bolt 6 and the bolt cap 3, and to connect to the lock cylinder 1 and to the bolt cap 3 which is attached to the anti-theft bolt 6. The lock cylinder housing 4 has a lower end 41 and an upper end 42. According to certain aspects, the lower end preferably has a circular groove 43 configured to adapt one or more ball bearings 5 that are inserted into the one or more indentations 68 of the anti-theft lock 6. The ball bearings 5 allow the lock cylinder housing 4 to turn on top of the anti-theft bolt 6, thereby providing an additional security feature as preventing turning of the anti-theft bolt by turning the housing. According to certain aspects, the lower end of the lock cylinder housing has dents 50 that match with flaps 8a on an outer perimeter of a control washer (shown in FIGS. 10 and 11). In this embodiment, the flaps of the control washer interact with the same number of dents on the lower end of lock cylinder housing. The washer temporarily locks the rotation of the lock cylinder housing relative to the bolt for the purpose of maneuvering the lock cylinder key between the open and closed position. If more torque is applied than what is necessary to maneuver the key, the flaps of the washer will flatten and allow the lock cylinder housing to rotate relative to bolt and bolt head preventing torque from being transferred to the bolt.

According to certain embodiments, the groove 43 is optional, and in another embodiment the lower end 41 of the housing is flat. In this embodiment the lock cylinder housing 4 is also turning on top of the anti-theft bolt 6, now only the ball bearings 5 roll on the lower flat edge of the lock cylinder housing 4.

FIG. 8 shows a cross sectional view of the device when assembled and the location of the ball bearings 5 can be seen between the flat surface of the anti-theft bolt and the lower end of the housings.

The upper opening 44 of the lock cylinder housing 4 has at least one flat surface 46. The flat surface enables insertion of the lock cylinder 1 as well as the bolt cap 3 in only one position such that the flat surface 10 of the lock cylinder 1 or the straight part 35 of the perimeter of the top part of the bolt cap slides along the flat surface 10 of the housing. Behind the flat surface 44 (meaning here into direction toward the lower end of the lock cylinder housing) there is at least one slot 49 into which the stud 11 can be turned. The at least one slot 49 has an upper inner edge 47 and a lower inner edge 48 and the at least one slot is used to block both the lock cylinder 1 and the bolt cap 3 in their place: FIG. 8 shows the lock stud 11 is blocked by upper inner edge 47 of the slot and the lip 36 of the is blocked by the lower inner edge 48 of the slot. Thus, when the anti-theft lock assembly is in locked position, the lock cannot be removed from the lock cylinder housing because the stud is blocked by the upper inner edge. The cylinder housing cannot be removed, because the lower inner edge is blocked by the lip of the bolt cap and the bolt cap is attached to the antitheft bolt 6 which again is threated to the article to be protected. The ball bearing connection between the anti-theft bolt 6 and the lock cylinder housing 4 prevents any kind or turning of the anti-theft bolt because the lock cylinder housing is rotating freely on the ball bearings. Instead of the ball bearings between the bolt cap and the lock cylinder housing, the assembly of this invention may as well use the control washer 7 to provide the rotation of the lock cylinder housing on the bolt as is shown in FIGS. 9,10 and 11. In this case the free rotation is temporarily locked (i.e. the free rotation is partial) when the flaps 8*a* of the washer coincide with the dents 50 of the lock cylinder housing. This is practical for the purpose of maneuvering the lock cylinder key between the open and closed positions. However, the control washer also provides free rotation of the lock cylinder housing on top of the bolt if more torque is applied than is necessary to turn the key because in such case the flaps will flatten and allow the lock cylinder housing to freely rotate. Thus, whether ball bearings or control washer is used, the result is an extra layer of protection as the free rotation of the lock cylinder housing prevents torque to be transferred to the bolt.

This enables assembly of the bolt lock in its place such that the lock housing is resting on anti-theft bolt after which the bolt cap is inserted through the upper opening of the housing and due to the matching shape of the upper opening and the top part of the bolt cap, the bolt cap goes through the housing in one position only, which position is such that the non-circular shape of the bottom part of the bolt cap automatically matches with the non-circular shape of the bore of the anti-theft bolt.

The assembly disclosed here has multitude of locking combinations depending on length of the lock cylinder. Preferably the assembly has at least 60 000 different combinations. The assembly may have 100 000 different combinations, 200 000 combination and even up to 8 million combinations. Accordingly, the assembly disclosed and claimed here provides a remarkable improvement as compared to any existing devices in the security.

Other variations to the disclosed embodiments can be understood and effected by those skilled in the art in practicing the claimed invention, from a study of the drawings, the disclosure and the appended claims. In the claims, the word 'comprising' does not exclude other elements or steps, and the indefinite article 'a' or 'an' does not exclude a plurality. The mere fact that certain measures are recited in mutually different dependent claims does not indicate that a combination of these measures cannot be used to advantage. Any reference signs in the claims should not be construed as limiting the scope.

LIST OF ELEMENTS

1 lock cylinder
2 counter sunk screw
3 bolt cap
4 lock cylinder housing
5 ball bearing
6 anti-theft bolt
7 control washer
8*a* flaps on an outer perimeter of the control washer
8*b* hexalobular shape of the inner perimeter of the control washer

9 spark plug
10 flat surface of the lock
11 stud
12 lock head
31 bottom part of the bolt cap
32 top part of the bolt cap
33 non circular perimeter of the bottom part
34 central hole of the bolt cap
35 straight part on the perimeter of the top part
36 lip
37 middle part
41 lower end of the housing
42 upper end of the housing
43 circular groove
44 upper opening of the housing
45 outer edge of the housing
46 flat surface of the upper opening
47 upper inner edge of the housing
48 lower inner edge of housing
49 slot
50 dents on the lower end of the housing
61 Head portion of the anti-theft bolt
62 shaft
63 external threading
64 flat upper surface
65 non circular perimeter of the center bore
66 center bore
67 threaded inner channel

What is claimed is:

1. An anti-theft locking bolt assembly comprising:
an anti-theft bolt, a bolt cap, a lock cylinder housing, and a lock cylinder;
the anti-theft bolt comprising a shaft and a head,
the shaft having an external threading configured to match a threating of an article to be protected, and an inner channel,
the head having a generally flat upper surface comprising a center bore having a noncircular perimeter;
the bolt cap having a top part, a bottom part, and a central hole extending through the top and bottom parts,
the top part having a perimeter larger than a perimeter of the bottom part thus forming a lip, the top part having at least one straight part on its perimeter, and
the bottom part having a non-circular perimeter matching with the non-circular perimeter of the center bore, and the bolt cap being configured to be attached with attaching means onto the anti-theft bolt through the central hole when the bottom part of the bolt cap is inserted into the central bore;
the cylindrical lock housing configured to cover the lock cylinder and the bolt cap and having at least one inner slot for adapting a lock stud and the lip of the bolt cap to provide a locking medium for the lock cylinder and the bolt cap, and the lock cylinder housing configured to rest on top of the anti-theft bolt head, wherein the assembly comprises means to allow at least partially free rotation of the lock cylinder housing on top of the anti-theft bolt head to prevent transfer of torque to the bolt; and
wherein the anti-theft bolt lock assembly is in locked position when the lock cylinder housing is resting on the anti-theft bolt, the bolt cap is inserted through the upper opening of the housing such that the bottom part of the bolt cap snugly fits into the central bore, the lip of the top part rests on an lower inner edge of the at least one slot of the lock cylinder housing, and the lock cylinder is inserted through the upper opening into the lock cylinder housing and turned such that the stud extends into the slot and is blocked by an upper inner edge of the slot.

2. The assembly of claim 1, wherein the non-circular perimeter of the bottom part and of the center bore has a polygonal pattern.

3. The assembly of claim 1, wherein the inner channel of the shaft opens into the bottom of the center bore.

4. The assembly of claim 3, wherein the means for attaching is a screw and the inner channel is threated.

5. The assembly of claim 1, wherein the means to allow at least partially free rotation of the lock cylinder housing comprises one or more ball bearings placed between the lock cylinder housing and the anti-theft bolt head.

6. The assembly of claim 5, wherein the flat surface of the anti-theft bolt comprises indentations to adapt the one or more ball bearings.

7. The assembly of claim 5, wherein the lower end of the lock cylinder housing has a circular groove to adapt the at least one bearing.

8. The assembly of claim 1, wherein the means to allow at least partially free rotation of the lock cylinder housing comprises at least one control washer placed between the lock cylinder housing and the anti-theft bolt head.

9. The assembly of claim 8, wherein the lower edge of the lock cylinder housing comprises dents corresponding to flaps on an outer circumference of the at least one control washer.

10. The assembly of claim 1, wherein the bolt cap has a middle part between the bottom and the top parts.

11. The assembly of claim 1, wherein the assembly has multitude of locking combinations, preferably such as at least 60,000 combinations depending on length of the lock cylinder.

12. The assembly of claim 1, wherein the outer threading of the anti-theft bolt mates with threads on a vehicle wheel hub, and the assembly is configured to prevent unauthorized removal of a vehicle wheel.

13. The assembly of claim 1, wherein the outer threading of the anti-theft bolt mates with a threading of combustion engine spark plug slot, and the assembly is configured to prevent unauthorized starting of the engine by replacing a spark plug with the assembly.

14. A method to prevent unauthorized removal of an article, the method comprising attaching the anti-theft lock assembly of any of the previous claim onto the article, wherein the article is a vehicle wheel or a combustion engine.

* * * * *